(12) United States Patent
Wilkinson et al.

(10) Patent No.: US 10,724,687 B2
(45) Date of Patent: Jul. 28, 2020

(54) COMPRESSED GAS CYLINDER QUICK RELEASE SAFETY CAP

(71) Applicants: Michael Wayne Wilkinson, Kenbridge, VA (US); Dennis Wayne Wilkinson, Kenbridge, VA (US); Joseph D. Goodman, Jr., Powhatan, VA (US)

(72) Inventors: Michael Wayne Wilkinson, Kenbridge, VA (US); Dennis Wayne Wilkinson, Kenbridge, VA (US); Joseph D. Goodman, Jr., Powhatan, VA (US)

( * ) Notice: Subject to any disclaimer, the term of this patent is extended or adjusted under 35 U.S.C. 154(b) by 0 days.

(21) Appl. No.: 16/118,049

(22) Filed: Aug. 30, 2018

(65) Prior Publication Data

US 2019/0063687 A1 Feb. 28, 2019

Related U.S. Application Data

(60) Provisional application No. 62/551,837, filed on Aug. 30, 2017.

(51) Int. Cl.
*F17C 13/06* (2006.01)
*B65D 41/04* (2006.01)
(Continued)

(52) U.S. Cl.
CPC .......... *F17C 13/06* (2013.01); *B65D 41/0471* (2013.01); *F16J 13/24* (2013.01);
(Continued)

(58) Field of Classification Search
CPC ....... F17C 13/06; F16J 37/23; F16L 2201/10; F16L 2201/20; F16L 33/227; B65D 88/54
See application file for complete search history.

(56) References Cited

U.S. PATENT DOCUMENTS 3,592,219 A 7/1971 Giese
4,434,903 A 3/1984 Cooke
(Continued)

FOREIGN PATENT DOCUMENTS

CN 1117944 C 8/2003
EP 2918891 A1 9/2015
(Continued)

OTHER PUBLICATIONS

CBM Technologies, Int'l Limited, http://gascylinders.sell.everychina.com/p-99671181-forged-steel-gas-cylinder-cap-cylinder-caps.html, downloaded Aug. 15, 2018.
(Continued)

*Primary Examiner* — Shawn M Braden
(74) *Attorney, Agent, or Firm* — NK Patent Law

(57) ABSTRACT

The subject matter described herein includes a safety device for a tank having a fluid material therein. The safety device includes a tank collar wherein the collar is threaded on an inner facing circumference and defines a groove on an outer facing circumference. The tank collar is engageably received by the tank by threadably engaging the threaded inner facing circumference with a correspondingly threaded outer facing surface of the tank. The safety device also includes a cap having a locking collar formed about an open end of the cap, wherein the collar defines apertures circumferentially spaced around an inner circumference thereof. The cap includes a locking ring configured for being translatably engaged with the locking collar. The cap includes at least one ball bearing that is received within one of the apertures. The at least one ball bearing is retractable and extendable within the aperture.

20 Claims, 8 Drawing Sheets

(51) Int. Cl.
*F16K 17/00* (2006.01)
*F16J 13/24* (2006.01)
*F16J 13/12* (2006.01)
*F17C 13/04* (2006.01)

(52) U.S. Cl.
CPC ............... *F16K 17/00* (2013.01); *F16J 13/12* (2013.01); *F17C 13/04* (2013.01)

(56) References Cited

U.S. PATENT DOCUMENTS

| | | | |
|---|---|---|---|
| 4,493,434 A | | 1/1985 | Beaujean et al. |
| 4,645,091 A | | 2/1987 | Madden et al. |
| 4,648,526 A | | 3/1987 | Wood, Jr. |
| 4,651,888 A | | 3/1987 | Wood, Jr. |
| 4,880,134 A | | 11/1989 | Wood, Jr. |
| 4,895,345 A | | 1/1990 | Gladbach et al. |
| 4,944,424 A | | 7/1990 | Wood, Jr. |
| 5,002,201 A | | 3/1991 | Hancock et al. |
| 5,088,685 A | | 2/1992 | Salvucci, Sr. |
| 5,261,559 A | | 11/1993 | Salvucci, Sr. |
| 5,688,874 A | * | 11/1997 | Hoffman ............... C08G 63/80 525/444 |
| 5,760,301 A | | 6/1998 | Shuman, Jr. |
| 6,164,344 A | | 12/2000 | Nickens et al. |
| 7,287,409 B2 | * | 10/2007 | Shiroza ............... B21D 24/08 267/119 |
| 7,887,104 B1 | * | 2/2011 | Wilson ............... F16L 37/23 285/148.21 |
| 8,826,931 B2 | | 9/2014 | Clark et al. |
| 8,857,647 B2 | | 10/2014 | Nakamura |
| 2004/0129013 A1 | * | 7/2004 | Gilbert ............... B60H 1/00485 62/292 |
| 2011/0278316 A1 | | 11/2011 | Herzer et al. |
| 2016/0003394 A1 | * | 1/2016 | Reasoner ............... F16L 37/091 251/149.6 |
| 2018/0335173 A1 | * | 11/2018 | DeLuna ............... F16L 37/23 |

FOREIGN PATENT DOCUMENTS

| | | |
|---|---|---|
| GB | 1271019 | 4/1972 |
| WO | WO1997011309 A1 | 3/1997 |
| WO | WO2013099757 A1 | 7/2013 |

OTHER PUBLICATIONS

USA Safety Solutions, Inc., http://www.usasafety.com/lockable-cylinder-safety-cap-snap-cap-p-61.html, May 2012, 1 page.
Griftan Inc., http://weldfabulous.com/gas-cylinder-regulator-protector-safety-cap-fine-thread/, Jul. 2015, 2 pages.
PCT, International Search Report and Written Opinion in International applicaiton No. PCT/US2018/048912 dated Dec. 26, 2018.
PCT, International Preliminary Report on Patentability in International application No. PCT/US2018/048912 dated Mar. 3, 2020.

* cited by examiner ial Patent Application Ser. No. 62/551,837
COMPRESSED GAS CYLINDER QUICK RELEASE SAFETY CAP

CROSS-REFERENCE TO RELATED APPLICATIONS

The present application claims priority to and benefit from U.S. Provisional Patent Application Ser. No. 62/551,837 titled "Compressed Gas Cylinder Quick Release Safety Cap", filed on Aug. 30, 2017, the content of which is incorporated by reference herein.

TECHNICAL FIELD

The presently disclosed subject matter is directed towards a compressed gas cylinder quick release safety cap. Specifically the presently disclosed subject matter is directed towards a retrofitable compressed gas cylinder quick release safety cap.

BACKGROUND

The present invention is directed to improving devices for protecting the valve, gauge, and regulator assembly of pressurized cylinders.

Gas cylinders typically comprise strong steel vessels of cylindrical shape in which gases are stored under high pressure. Provided at one end of the gas cylinder is a necked down portion having a cylinder valve including a valve outlet fitting to which a pressure regulator or the like can be connected. A hand-wheel for operating the valve is typically permanently attached to the valve stem.

Threads on the necked down portion of the cylinder provide a means whereby a heavy steel cap is screwed over the valve to protect it from injury during shipment. If the cylinder valve should ever be broken off, the very high pressure of the gas in the cylinder, under escaping tends to give the cylinder rocket propulsion. Because of this danger, it is essential that the cap be in place during shipment and handling of the gas cylinder.

OSHA's construction standard for storing compressed gas cylinders are addressed in § 1926.350(a), which states in part:

OSHA standards § 1926.350 Gas welding and cutting.
(a) Transporting, moving, and storing compressed gas cylinders.
  (1) Valve protection caps shall be in place and secured.
  (6) Unless cylinders are firmly secured on a special carrier intended for this purpose, regulators shall be removed and valve protection caps put in place before cylinders are moved.

Gases such as chlorine are customarily shipped and stored prior to use in cylindrical tanks. These tanks have a gas release valve at their top through which the gas is pumped to fill the tank, and through which the gas is permitted to escape when it is desired to use the gas. A cap is generally provided to protect the valve from damage when the tank is shipped, stored or otherwise not in use. This cap completely covers the valve and is seated on the tank over the valve by twisting its threaded lower inner edge onto the threaded nub of a cap plate which is attached to the tank with its threaded nub surrounding and concentric with the base of the valve.

High-pressure gas cylinders hold industrial and welding gases for example carbon dioxide, oxygen, propane, nitrogen, argon, Freon, helium, and hydrogen. The gas pressures can range from 2,000 to 3,000 psi. Upon delivery of a high-pressure gas cylinder to its ultimate destination be it a plant, factory, shop, or hospital, it is installed for use with its shut-off valve connected to a regulator which has its own monitoring pressure gauge. In such an installation the valve is exposed to damage and tampering. High-pressure gas cylinders have sufficient propulsive force to drive through a concrete wall in the event the shut-off valve is broken off or damaged. What is needed is a secure, efficient way of installing and removing a safety cap to protect the valve.

SUMMARY

This summary is provided to introduce in a simplified form, concepts that are further described in the following detailed descriptions. This summary is not intended to identify key features or essential features of the claimed subject matter, nor is it to be construed as limiting the scope of the claimed subject matter.

Disclosed herein is a safety device for a tank having a fluid material therein. The safety device includes a tank collar wherein the collar is threaded on an inner facing circumference and defines a groove on an outer facing circumference. The tank collar is engageably received by the tank by threadably engaging the threaded inner facing circumference with a correspondingly threaded outer facing surface of the tank.

The safety device also includes a cap having a locking collar formed about an open end of the cap, wherein the collar defines apertures circumferentially spaced around an inner circumference thereof. The cap includes a locking ring configured for being translatably engaged with the locking collar. The cap includes at least one ball bearing that is received within one of the apertures. The at least one ball bearing is retractable and extendable within the aperture. In operation, the locking ring is translated relative to the locking collar to force extension of the ball bearings into the groove of the tank collar while the cap is positioned proximal the tank to thereby secure the cap to the tank.

The cap also includes a spring for returning the locking ring to a locked position after turning and releasing the locking ring. The cap includes a retaining ring for securing the locking collar on the cap. The cap may also include at least two ventilation holes positioned on opposite ends of the cap.

According to one or more embodiments of the presently disclosed subject matter, the tank collar is made from metal. According to one or more embodiments, the cap is made from metal.

According to one or more embodiments of the presently disclosed subject matter, the groove defines a race surface having a generally arcuate cross-section for receiving the ball bearings.

According to one or more embodiments of the presently disclosed subject matter, the locking collar defines a circumferentially extending recess that receives the retaining ring.

According to one or more embodiments of the presently disclosed subject matter, the locking collar defines a post to which the spring is engaged on one end. The spring is further engaged on another end to the locking ring.

According to one or more embodiments of the presently disclosed subject matter, the locking collar defines a shoulder on a bottom facing surface thereof for resting against the tank and providing a surface for translation of the locking ring.

According to one or more embodiments of the presently disclosed subject matter, the ball bearings extend outwardly radially from the apertures.

According to one or more embodiments of the presently disclosed subject matter, the locking ring defines a plurality of inner facing ramp surfaces. The ramp surfaces define a first dimensioned surface in which contact with the ball bearings does not cause engagement with the groove of the tank collar. The ramp surfaces also define a second dimensioned surface in which contact with the ball bearings does cause engagement with or nesting within the groove of the tank collar.

According to one or more embodiments, each ramp surface is separated from an adjacent ramp surface.

According to one or more embodiments of the presently disclosed subject matter, the cap is selectively lockable.

According to one or more embodiments of the presently disclosed subject matter, the tank collar defines a shoulder extending therefrom and beyond a diameter of the tank for preventing the cap from contacting a valve when the tank collar is engaged with the cap.

According to one or more embodiments is a method of installing a safety device for a tank including selectively engaging a tank collar with a threaded portion protruding from a compressed gas container. The collar defines a race on an outer facing periphery and a threaded portion on an inner facing periphery that engages the threaded portion of the compressed gas container. The method also includes selectively engaging a cap with the race by extending at least one bearing ball from a retracted position to an extended position to thereby engage the cap with the collar.

According to one or more embodiments of the presently disclosed subject matter, the tank collar is metal.

According to one or more embodiments of the presently disclosed subject matter, the cap is metal.

According to one or more embodiments, the at least one ball bearing extends outwardly radially.

According to one or more embodiments of the presently disclosed subject matter, the cap is selectively lockable.

According to one or more embodiments, the tank collar defines a shoulder extending therefrom and beyond a diameter of the container for preventing the cap from contacting a valve when the tank collar is engaged with the cap.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
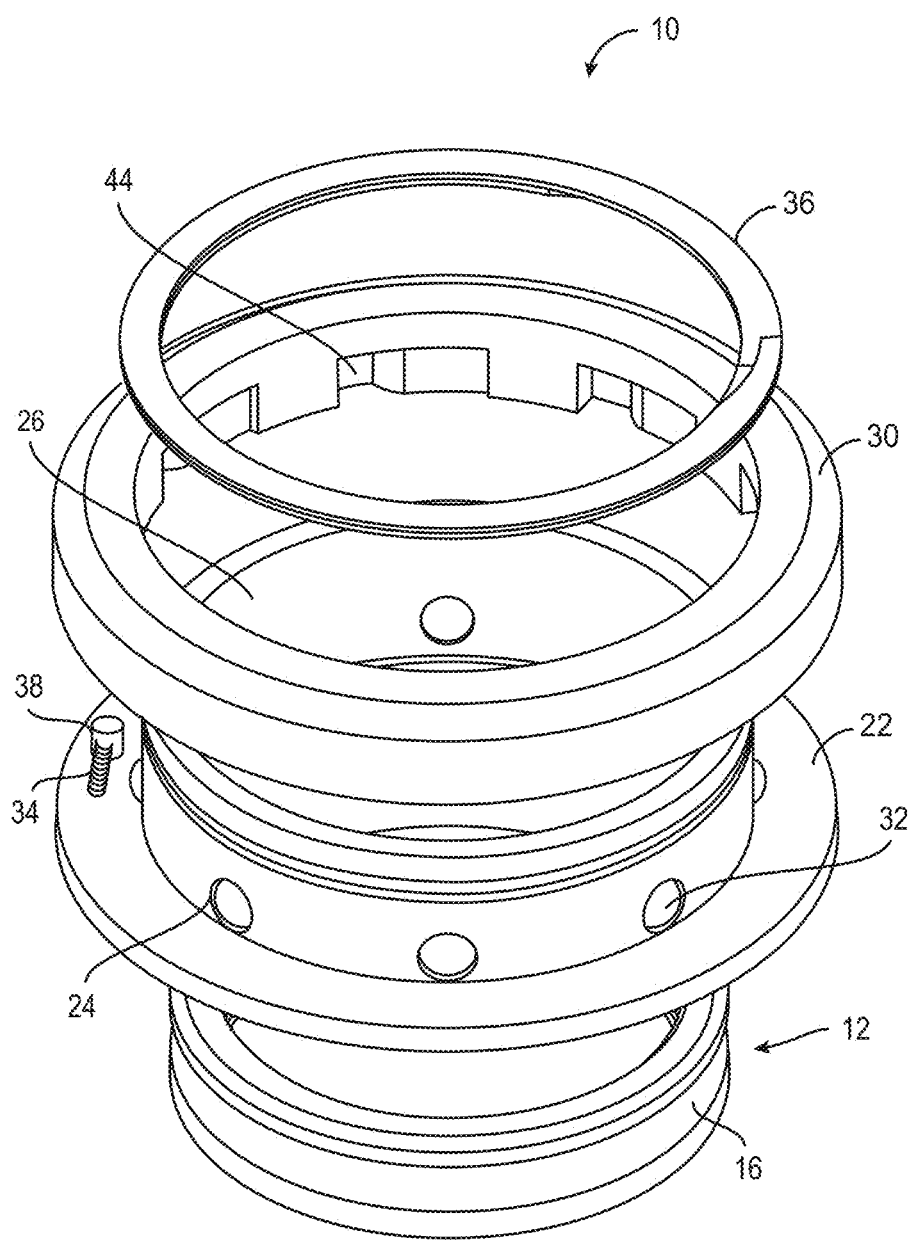
FIG. 1 is an exploded view of a safety device, according to one or more embodiments of the presently disclosed subject matter.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

At least one embodiment of the presently disclosed subject matter is illustrated throughout the drawings and in particular reference to FIG. 1. Disclosed in FIG. 1, is a safety device 10 for a tank having a fluid material therein. The fluid material may be a liquid, a gas, or a mixture thereof. The terms "tank", "cylinder", and "container" may be used interchangeably. The safety device 10 includes a tank collar 12 wherein the collar is threaded on an inner facing circumference 14, as illustrated in FIG. 4B, and defines a groove 16 on an outer facing circumference. The tank collar 12 is engageably received by the tank by threadably engaging the threaded inner facing circumference 14 with a correspondingly threaded outer facing surface of the tank (not shown). The tank collar 12 can be placed on top of the threaded outer facing surface of the tank, and turned in a clockwise direction until secure.

Figure 3A:
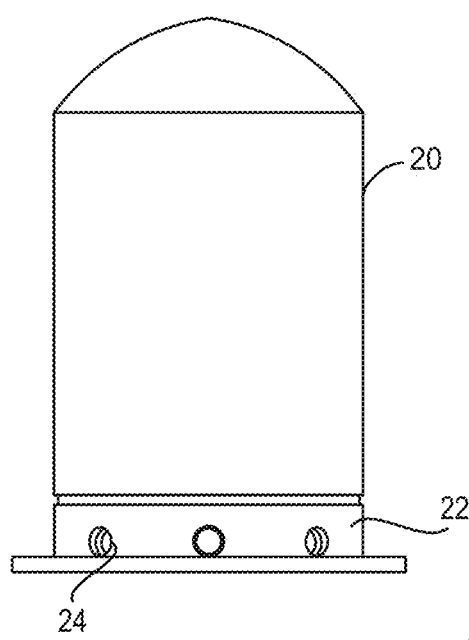
FIG. 3A is a front facing view of a cap, according to one or more embodiments of the presently disclosed subject matter.
Figure 3B:
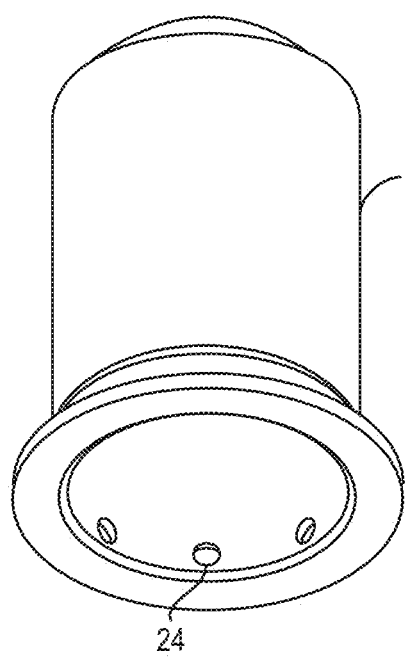
FIG. 3B is a perspective view of the cap, according to one or more embodiments of the presently disclosed subject matter.

As illustrated in FIG. 3A, the safety device 10 also includes a cap 20 having a locking collar 22 formed about an open end of the cap, wherein the collar defines apertures 24 circumferentially spaced around an inner circumference 26 (see FIGS. 1 and 8) thereof. The cap includes a locking ring 30 configured for being translatably engaged with the locking collar 22. The cap 20 includes at least one ball bearing 32 that is received within one of the apertures 24. The at least one ball bearing 32 may be fixedly attached or removably coupled to the cap 20. The at least one ball bearing 32 is retractable and extendable within the aperture 24. In operation, the locking ring 30 is translated relative to the locking collar 22 to force extension of the ball bearings 32 into the groove 16 of the tank collar 12 while the cap 20 is positioned proximal the tank thereby securing the cap 20 to the tank.

Figure 3C:
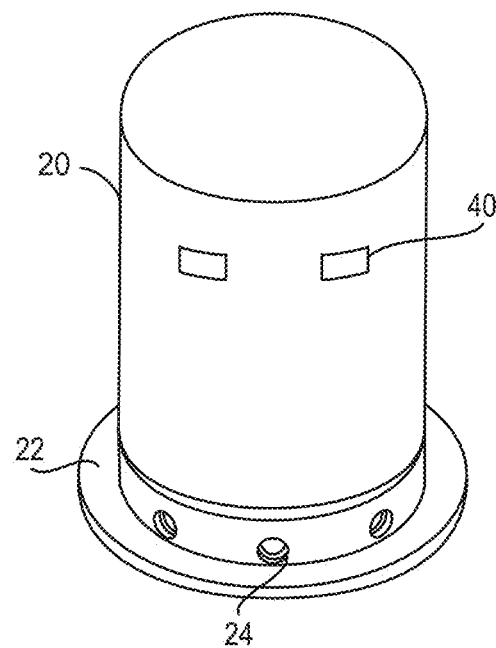
FIG. 3C is a perspective view of the cap, according to one or more embodiments of the presently disclosed subject matter.
Figure 3D:
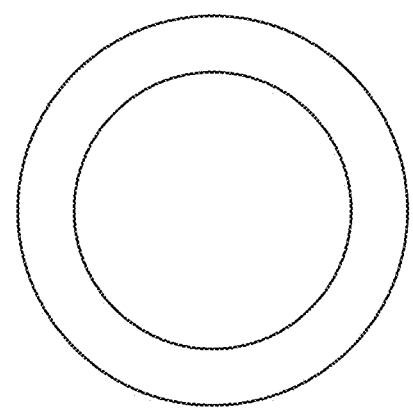
FIG. 3D is a bottom view of the cap, according to one or more embodiments of the presently disclosed subject matter.

The cap 20 includes a spring 34 for returning the locking ring 30 to a locked position after turning and releasing the locking ring 30. The locking collar 22 may also include a post 38 for helping to locate the return spring 34. The cap 20 also includes a retaining ring 36 for securing the locking collar 22 on the cap 20. The cap may also include at least two ventilation holes 40 positioned on opposite ends of the cap 20 as illustrated in FIG. 3C.

There may be more or less than two ventilation holes 40, depending on legal requirements and industry standards in the jurisdiction where the safety device is being used. The ventilation holes 40 can be placed anywhere on the cap 20. Any ventilation system known or used in the art may be used in lieu of ventilation holes.

According to one or more embodiments, the tank collar 12 is made from metal. According to one or more embodiments, the cap 20 is made from metal. The materials used to construct the safety device can be made from any substance known or used in the art, including but not limited to polymer, metal, ceramic, and combinations thereof.

Figure 4A:
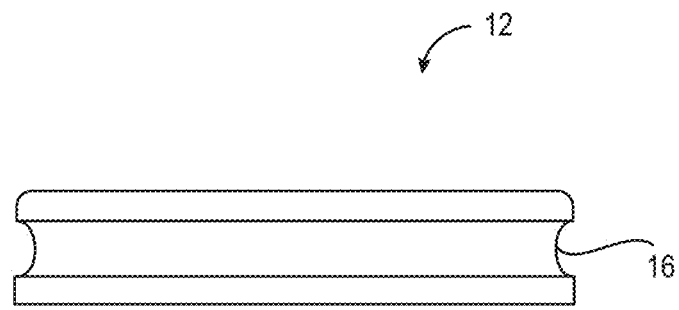
FIG. 4A is a front facing view of a tank collar, according to one or more embodiments of the presently disclosed subject matter.
Figure 4B:
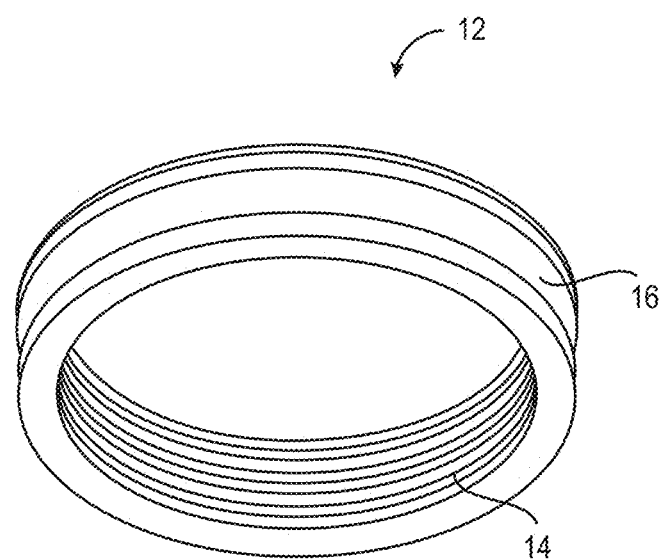
FIG. 4B is a perspective view of the tank collar, according to one or more embodiments of the presently disclosed subject matter.

According to one or more embodiments of the presently disclosed subject matter, the groove 16 defines a race surface, as shown in FIG. 4A, having a generally arcuate cross-section for receiving the ball bearings 32.

In another embodiment of the presently disclosed subject matter, the locking collar 22 defines a circumferentially extending recess that receives the retaining ring 36, as illustrated in FIGS. 1 and 8.

In another embodiment of the presently disclosed subject matter, the locking collar 22 defines a post 38 to which the spring 34 is engaged on one end. The spring 34 is further engaged on another end to the locking ring 30.

In another embodiment of the presently disclosed subject matter, the locking collar 22 defines a shoulder on a bottom facing surface thereof for resting against the tank and providing a surface for translation of the locking ring 30.

In another embodiment of the presently disclosed subject matter, the ball bearings 32 extend outwardly radially from the apertures 24.

Figure 5A:
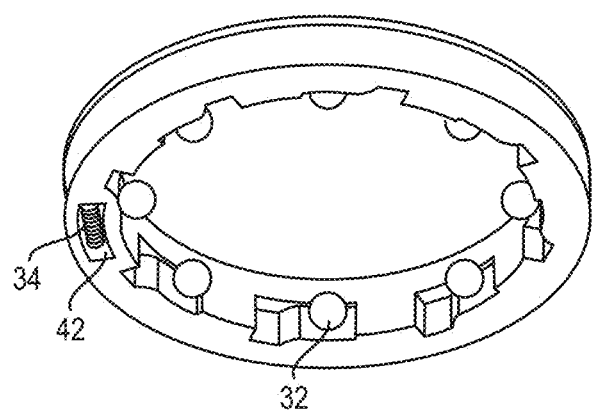
FIG. 5A is a bottom perspective view of a locking ring, according to one or more embodiments of the presently disclosed subject matter.
Figure 5B:
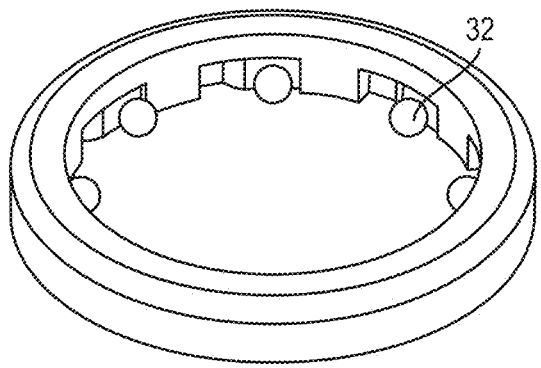
FIG. 5B is a top perspective view of the locking ring, according to one or more embodiments of the presently disclosed subject matter.
Figure 5C:
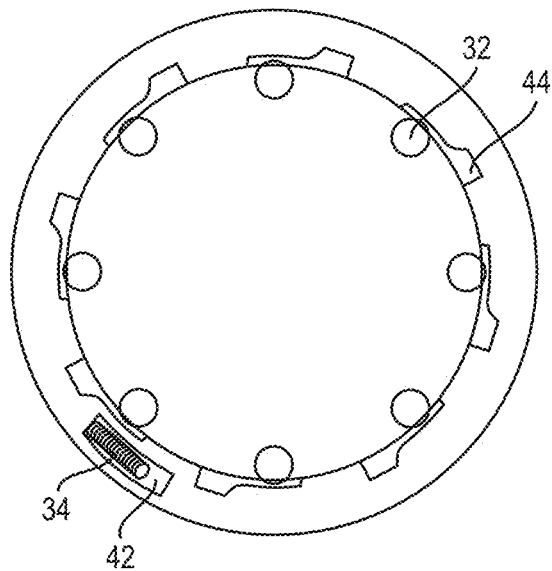
FIG. 5C is a bottom view of the locking ring, according to one or more embodiments of the presently disclosed subject matter.

In another embodiment of the presently disclosed subject matter, the locking ring 30 defines a plurality of inner facing ramp surfaces. The ramp surfaces define a first dimensioned surface in which contact with the ball bearings 32 does not cause engagement with the groove 16 of the tank collar 12. The ramp surfaces also define a second dimensioned surface in which contact with the ball bearings 32 does cause engagement with or nesting within the groove 16 of the tank collar 12. According to another embodiment, each ramp surface is separated from an adjacent ramp surface as illustrated in FIGS. 5A, 5B, and 5C.

In another embodiment of the presently disclosed subject matter, the cap 20 is selectively lockable. The locking mechanism can employ any system known or used in the art including but not limited to a latch, pad lock, magnetic lock, and combinations thereof.

In another embodiment of the presently disclosed subject matter, the tank collar 12 defines a shoulder extending therefrom and beyond a diameter of the tank for preventing the cap 20 from contacting a valve when the tank collar 12 is engaged with the cap. The purpose of the shoulder is to prevent the valve from being damaged if the tank falls on its side. The shoulder is the first point of contact with the ground instead of the cap 20. This prevents the cap 20 from crushing the valve and possibly releasing pressurized fluid.

Disclosed herein is a method of installing a safety device for a tank including selectively engaging a tank collar 12 with a threaded portion protruding from a compressed gas container. As illustrated in FIGS. 4A and 4B, the collar 12 defines a race 16 on an outer facing periphery and a threaded portion on an inner facing periphery 14 that engages the threaded portion of the compressed gas container. The method further includes selectively engaging a cap 20 with the race 16 by extending at least one bearing ball 32 from a retracted position to an extended position to thereby engage the cap 20 with the collar 12.

According to one or more embodiments, the tank collar 12 is metal. The tank collar 12 can be made from any substance known or used in the art, including but not limited to polymer, metal, ceramic, and combinations thereof.

According to one or more embodiments, the cap 20 is metal. The cap can be made from any substance known or used in the art, including but not limited to polymer, metal, ceramic, and combinations thereof. The cap 20 may be included in the safety device 10, or it can be a pre-existing cap that is retrofitted to be used with the safety device. This is advantageous because it obviates the need for a large producer to purchase hundreds of new caps to employ the safety device 10 of the presently disclosed subject matter. The components of the safety device 10 may be fixedly attached, such as welded to, or removably coupled to the cap 20.

According to one or more embodiments, the at least one ball bearing 32 extends outwardly radially.

According to one or more embodiments, the cap 20 is selectively lockable. The locking mechanism can employ any system known or used in the art including but not limited to a latch, pad lock, magnetic lock, and combinations thereof.

According to one or more embodiments, the tank collar 12 defines a shoulder extending therefrom and beyond a diameter of the container for preventing the cap 20 from contacting a valve when the tank collar 12 is engaged with the cap. The purpose of the shoulder is to prevent the valve from being damaged if the container falls on its side. The shoulder is the first point of contact with the ground instead of the cap 20. This prevents the cap from crushing the valve and possibly releasing pressurized fluid.

As illustrated in FIGS. 5A and 5C, the locking ring 30 includes a spring slot 42 for accommodating the spring 34. The spring 34 pushes against a pin on the cap 20 to force the locking ring 30 into a locked position. The locking ring 30 defines tapered slots 44 (or ramp surfaces), as illustrated in FIG. 5C, that force the at least one ball bearing 32 into the tank collar 12 when locked and allow the at least one ball bearing 32 to retract when unlocked.

Figure 2:
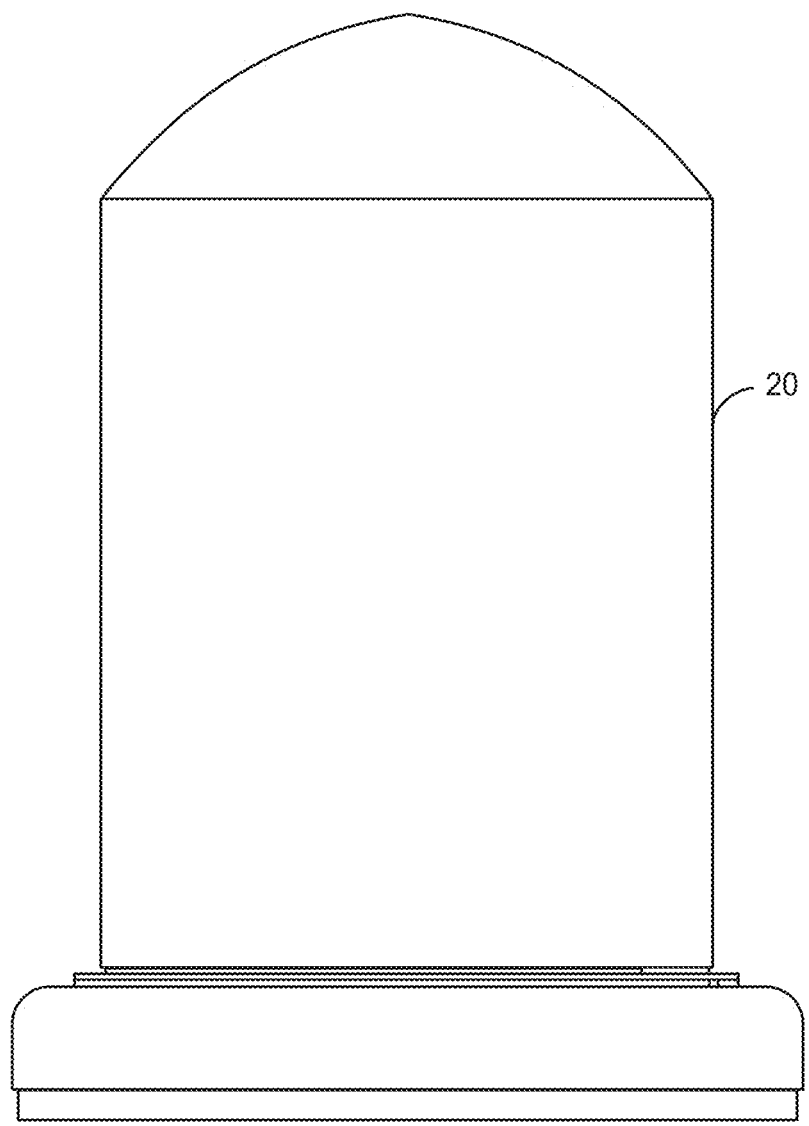
FIG. 2 is a front facing view of the safety device, according to one or more embodiments of the presently disclosed subject matter.
Figure 6:
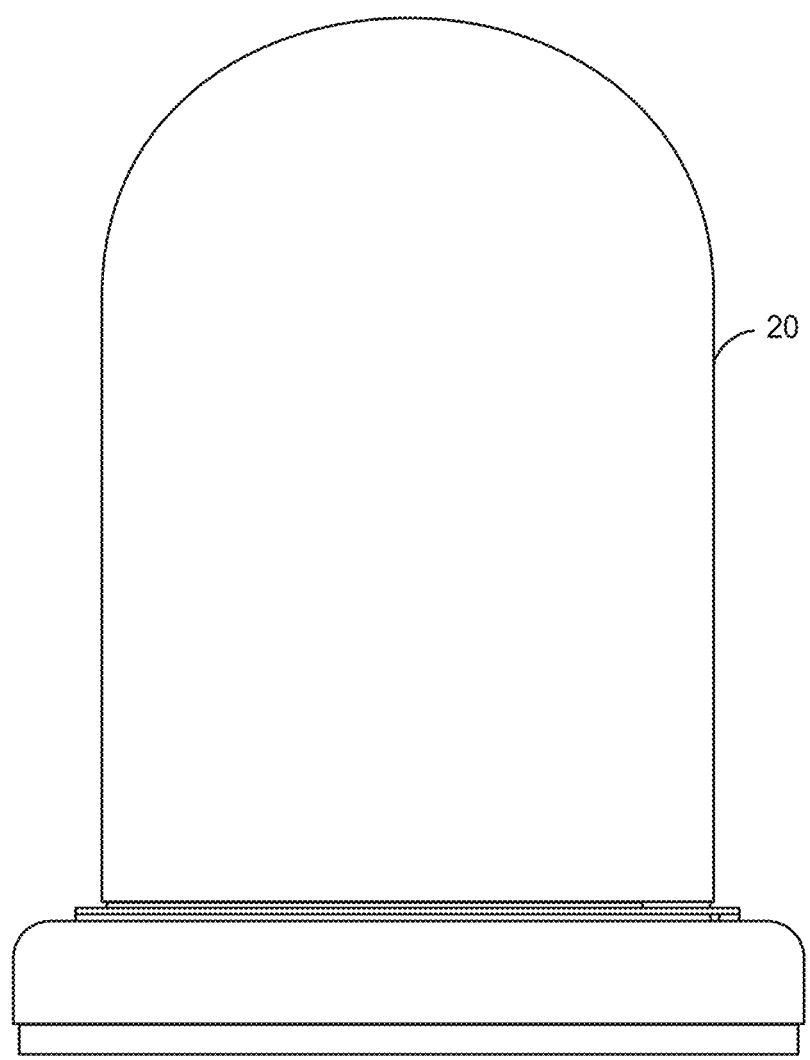
FIG. 6 is a front facing view of the safety device, according to one or more embodiments of the presently disclosed subject matter.
Figure 7:
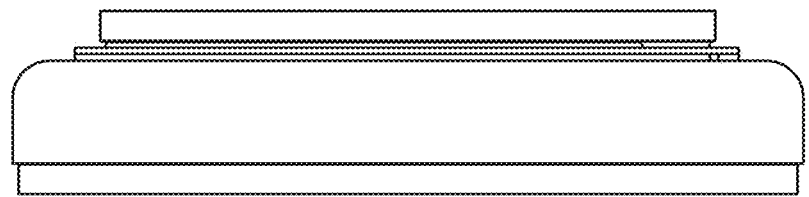
FIG. 7 is a front facing view of a safety cap retrofit, according to one or more embodiments of the presently disclosed subject matter.
Figure 8A:
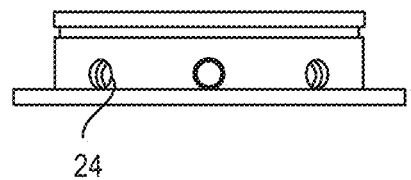
FIG. 8A is a front facing view of a locking collar, according to one or more embodiments of the presently disclosed subject matter.
Figure 8B:
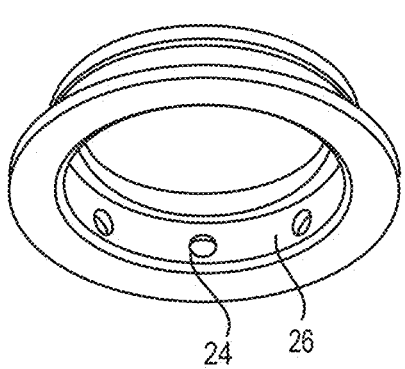
FIG. 8B is a bottom perspective view of the locking collar, according to one or more embodiments of the presently disclosed subject matter.
Figure 8C:
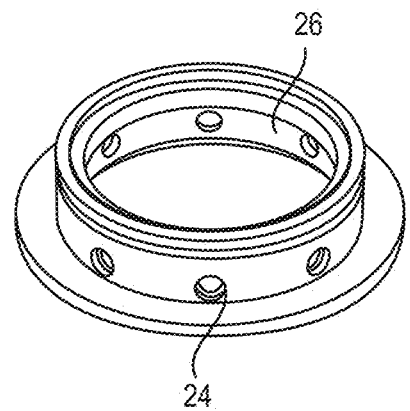
FIG. 8C is a top perspective view of the locking collar, according to one or more embodiments of the presently disclosed subject matter.
Figure 8D:
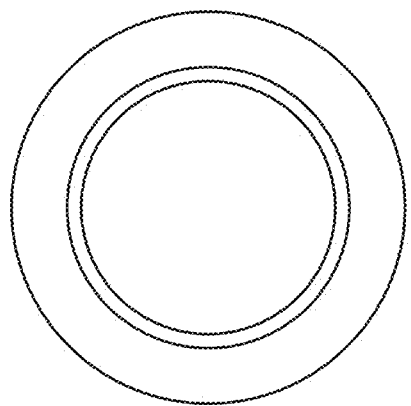
FIG. 8D is a bottom facing view of the locking collar, according to one or more embodiments of the presently disclosed subject matter.

FIGS. 2 and 6 illustrate one or more embodiments where the safety device includes the cap 20. In FIGS. 2 and 6 the cap covers the components of the safety device and is engaged with the tank collar. The components of the safety device may be fixedly attached or coupled to the cap.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed:

1. A safety device for a tank having a fluid material therein, the device comprising:
   a tank collar wherein the collar is threaded on an inner facing circumference and defines a groove on an outer facing circumference, the tank collar being engageably received by the tank by threadably engaging the threaded inner facing circumference with a correspondingly threaded outer facing surface of the tank; and
   a cap having:
      a locking collar formed about an open end of the cap, wherein the collar defines apertures circumferentially spaced around an inner circumference thereof;
      a locking ring configured for being translatably engaged with the locking collar;
      at least one ball bearing that is received within one of the apertures, the at least one ball bearing being retractable and extendable within the aperture;
      wherein, in operation, the locking ring is translated relative to the locking collar to force extension of the ball bearings into the groove of the tank collar while the cap is positioned proximal the tank to thereby secure the cap to the tank;
      a spring for returning the locking ring to a locked position after turning and releasing the locking ring;
      a retaining ring for securing the locking collar on the cap; and
      at least two ventilation holes positioned on opposite ends of the cap.

2. The safety device of claim 1, wherein the tank collar is metal.

3. The safety device of claim 1, wherein the cap is metal.

4. The safety device of claim 1, wherein the groove defines a race surface having a generally arcuate cross-section for receiving the ball bearings.

5. The safety device of claim 1, wherein the locking collar defines a circumferentially extending recess that receives the retaining ring.

6. The safety device of claim 1, wherein the locking collar defines a post to which the spring is engaged on one end, the spring further engaged on another end to the locking ring.

7. The safety device of claim 1, wherein the locking collar defines a shoulder on a bottom facing surface thereof for resting against the tank and providing a surface for translation of the locking ring.

8. The safety device of claim 1, wherein the ball bearings extend outwardly radially from the apertures.

9. The safety device of claim 1, wherein the locking ring defines a plurality of inner facing ramp surfaces, the ramp surfaces defining a first dimensioned surface in which contact with the ball bearings does not cause engagement with the groove of the tank collar, and a second dimensioned surface in which contact with the ball bearings does cause engagement with or nesting within the groove of the tank collar.

10. The safety device of claim 9, wherein each ramp surface is separated from an adjacent ramp surface.

11. The safety device of claim 1, wherein the cap is selectively lockable.

12. The safety device of claim 1, wherein the tank collar defines a shoulder extending therefrom and beyond a diameter of the tank for preventing the cap from contacting a valve when the tank collar is engaged with the cap.

13. A method of installing a safety device for a tank comprising:
   selectively engaging a tank collar with a threaded portion protruding from a compressed gas container, wherein the tank collar defines a race on an outer facing periphery and a threaded portion on an inner facing periphery that engages the threaded portion of the compressed gas container; and
   selectively engaging a cap with the race by extending at least one bearing ball from a retracted position to an extended position to thereby engage the cap with the tank collar,
   wherein the cap has:
      a locking collar formed about an open end of the cap, wherein the locking collar defines apertures circumferentially spaced around an inner circumference thereof;
      a locking ring configured for being translatably engaged with the locking collar;
      a spring for returning the locking ring to a locked position after turning and releasing the locking ring; and
      a retaining ring for securing the locking collar on the cap.

14. The method of claim 13, wherein the tank collar is metal.

15. The method of claim 13, wherein the cap is metal.

16. The method of claim 13, wherein the at least one ball bearing extends outwardly radially.

17. The method of claim 13, wherein the cap is selectively lockable.

18. The method of claim 13, wherein the tank collar defines a shoulder extending therefrom and beyond a diameter of the container for preventing the cap from contacting a valve when the tank collar is engaged with the cap.

19. A safety device for a tank having a fluid material therein, the device comprising:
   a tank collar wherein the collar is threaded on an inner facing circumference and defines a groove on an outer facing circumference, the tank collar being engageably received by the tank by threadably engaging the threaded inner facing circumference with a correspondingly threaded outer facing surface of the tank; and
   a cap having:
      a locking collar formed about an open end of the cap, wherein the collar defines apertures circumferentially spaced around an inner circumference thereof;
      a locking ring configured for being translatably engaged with the locking collar;
      at least one ball bearing that is received within one of the apertures, the at least one ball bearing being retractable and extendable within the aperture;
      wherein, in operation, the locking ring is translated relative to the locking collar to force extension of the ball bearings into the groove of the tank collar while the cap is positioned proximal the tank to thereby secure the cap to the tank;
      a spring for returning the locking ring to a locked position after turning and releasing the locking ring;
      a retaining ring for securing the locking collar on the cap; and
      at least one ventilation hole.

20. The safety device of claim 19, wherein the locking collar defines a post to which the spring is engaged on one end, the spring further engaged on another end to the locking ring.

* * * * *